(12) United States Patent
Palmade et al.

(10) Patent No.: US 11,995,504 B2
(45) Date of Patent: May 28, 2024

(54) METHOD FOR DETECTING THE HANDLING OF PRODUCTS ON A DISPLAY STAND, DISPLAY STAND AND AUTOMATED SHOP

(71) Applicant: CENTILOC, Meyreuil (FR)

(72) Inventors: Romain Palmade, Auriol (FR); Loïc Henninot, La Penne sur Huveaune (FR); Frédérick Bonnin, Rousset (FR)

(73) Assignee: CENTILOC, Meyreuil (FR)

( * ) Notice: Subject to any disclaimer, the term of this patent is extended or adjusted under 35 U.S.C. 154(b) by 15 days.

(21) Appl. No.: 17/640,623

(22) PCT Filed: Sep. 14, 2020

(86) PCT No.: PCT/EP2020/075646
§ 371 (c)(1),
(2) Date: Mar. 4, 2022

(87) PCT Pub. No.: WO2021/052909
PCT Pub. Date: Mar. 25, 2021

(65) Prior Publication Data
US 2022/0358302 A1 Nov. 10, 2022

(30) Foreign Application Priority Data
Sep. 16, 2019 (FR) ..................................... 1910193

(51) Int. Cl.
*G06K 7/10* (2006.01)
*G06Q 10/087* (2023.01)
(52) U.S. Cl.
CPC ....... *G06K 7/10475* (2013.01); *G06Q 10/087* (2013.01)
(58) Field of Classification Search
CPC ........................ G06K 7/10475; G06Q 10/087
(Continued)

(56) References Cited

U.S. PATENT DOCUMENTS 10,037,509 B1 7/2018 Huebner et al.
10,262,293 B1 4/2019 Prater et al.
(Continued)

FOREIGN PATENT DOCUMENTS

| KR | 101860944 B1 | 5/2018 |
| WO | 2021038167 A2 | 3/2021 |
| WO | 2021048151 A1 | 3/2021 |

OTHER PUBLICATIONS

International Search Report (PCT/ISA/210) with English translation and Written Opinion (PCT/ISA/237) mailed on Oct. 15, 2020, by the European Patent Office as the International Searching Authority for International Application No. PCT/EP2020/075646.

*Primary Examiner* — Daniel A Hess
(74) *Attorney, Agent, or Firm* — BUCHANAN INGERSOLL & ROONEY PC (57) ABSTRACT

The invention concerns a method for detecting the handling of products on a display stand by a person, the products being provided with electronic tags, each person being associated with a communicating object, the display stand comprising a near-field communication device and at least two receivers. The method comprises the repetition of: a product inventory step during which the display stand sends and receives messages communicated by near-field communication in order to identify and locate the products; a step of comparing inventories in order to determine, between two successive inventories, a product removed from or added to the display stand and the position thereof; a step of locating a person by triangulation using the radio-frequency receivers receiving a signal from the communicating object; an association step during which a person is associated with a product when they are close.

10 Claims, 4 Drawing Sheets

(58) Field of Classification Search
USPC .......................................................... 235/385
See application file for complete search history.

(56) References Cited

U.S. PATENT DOCUMENTS

2017/0024756 A1   1/2017   Hulth
2017/0193593 A1   7/2017   Na et al.

METHOD FOR DETECTING THE HANDLING OF PRODUCTS ON A DISPLAY STAND, DISPLAY STAND AND AUTOMATED SHOP

TECHNICAL FIELD

The present invention relates to a method for detecting the handling of products on a display stand, as well as to the display stand used to implement said method. More particularly, the invention also relates to the automated retail business, and in particular to a shop using the display stand and implementing the method for detecting the handling of products.

TECHNOLOGICAL BACKGROUND

Patent application US2017/0193593 discloses an automated shop system which determines that a product is being taken by a user as soon as the user stands close to a set of shelves containing a product. There are several uncertainties in this system. The fact of a user standing in front of a set of shelves is not sufficient to determine that the user is taking a product. Moreover, if the user does take a product, it is difficult to say how many products have actually been taken by the user. In addition, the set of shelves must be correctly organized in order to be sure that the product indeed corresponds to a product from the set of shelves.

In order to be sure of the contents of a set of shelves, an inventory can be taken of the set of shelves. U.S. Pat. No. 10,037,509 discloses an automated inventory system using RFID (Radio Frequency Identification) technology making it possible to identify all of the products placed on a set of shelves.

U.S. Pat. No. 10,262,293 discloses a system for tracking products on a shop display stand and for tracking a customer in the shop in order to determine if the customer is taking or replacing a product from or on the display stand. The aim of such a system is to carry out automatic billing of the products taken by the customer and to avoid them having to pass through the checkout, which can be tiresome. A multitude of sensors of different types is used in order to determine if a product has been taken from or replaced on the display stand. To this end, information originating from cameras, from presence detectors and weight sensors mounted on a display stand makes it possible to determine which product has been taken from or replaced on a display stand. Such a system is relatively costly and complex to install. Moreover, such a system is not completely reliable and can be tricked by an ill-intentioned user. A product can be replaced with another which costs less and has the same weight, and the different appearance of which is not easily identifiable by a camera or by a presence detector.

Additionally, NFC (Near-Field Communication) technology makes it possible to send a product identifier, generally unique, to a reader as soon as a product is equipped with an electronic identification tag. NFC technology uses a magnetic field which makes communication possible at a few centimetres from the reader and thus makes it possible to locate a product on a shop display stand very accurately.

The French patent application filed on 29 Aug. 2019 under the number 19-09528 and with the title "plateau de communication en champ proche et procédé de localisation sur ledit plateau" discloses a communication surface using NFC technology which makes it possible to accurately locate an object equipped with an electronic tag on a communication surface. Said patent application proposes a solution which can be used for tracking products on a shelving unit or a shop display stand. The above-mentioned surface proposes a solution that makes it possible for each removal or placement of products to be easily detectable, with a locating accuracy of the order of a few centimetres.

The French patent application filed on 10 Sep. 2019 under the number 19-09939 and with the title "dispositif mâle, dispositif femelle et systéme de communication en champ proche" discloses a display stand hook integrating an NFC antenna. The disclosed hook makes it possible to identify all the products placed on said hook, using electronic tags placed on the products and having an antenna situated around a suspension hole of the packaging of the product. Such a hook also makes it possible to know the position of a product on said hook.

The automation of self-service shops needs solutions that are simple and inexpensive to install, while ensuring a high operational reliability.

SUMMARY OF THE INVENTION

The invention aims to solve the problem of locating both products and people in a shop in a simple and low-cost manner, while ensuring reliability of the handling of the products. According to the invention, the movement of the products is detected by NFC technology. A person is located using a communicating object by triangulation of messages received from said object by radio frequency.

According to a first embodiment, the invention proposes a method for detecting the handling of products on a display stand by one or more people, said products being equipped with electronic tags each containing a unique identifier, each person being associated with an object communicating by radio frequency and periodically transmitting a signaling signal, said display stand comprising a plurality of near-field communication antennas, and at least two radio frequency receivers being placed close to the display stand, a central processing unit being connected to said display stand and to said receivers in order to carry out said method, which comprises repeating the following steps:

a product inventory step, during which the display stand sends and receives messages via the near-field communication antennas in order to identify and to locate the electronic tags of products present on the display stand, a step of comparing inventories, during which the central processing unit determines a difference in the products present on the display stand between two successive inventory steps, said step identifying a product removed from or added to said display stand and determining a position on said display stand where said product was removed or added, a person-locating step, during which each of the radio frequency receivers receives a signaling signal, transmitted by an object communicating by radio frequency, measures the strength of the received signal and determines the position of the communicating object associated with a person by triangulation as a function of the position of the radio frequency receivers and the measurement of the strength of the received signal, an association step, during which the central processing unit associates a person with a product when the position of the communicating object associated with said person is located close to the position of the identified electronic tag of a product having been removed from or added to the display stand, said associated person in question having removed the product from or replaced it on the display stand.

According to an embodiment example, the association step can associate the person with the identified product when the communicating object is located at a distance from the electronic tag that is less than a first distance threshold.

According to another embodiment example, when one or more communicating objects are located at a distance from the electronic tag that is greater than the first distance threshold and less than a second distance threshold, the association step associates the person associated with the communicating object closest to the electronic tag of said product with the product.

Preferably, the radio frequency receivers can be receivers which comply with the IEEE Standard 802.15.1. The signaling signal can be a signaling message indicating a unique identifier of the communicating object having sent said message. The triangulation can be carried out on the messages received by the at least two receivers as a function of a measurement of the strength of the signal received by each of said receivers for the messages containing the same unique identifier, and the position of said receivers.

According to a second embodiment, the invention proposes a product display stand comprising one or more presentation elements intended to receive products equipped with electronic tags. The presentation elements each comprise one or more near-field communication antennas, said near-field communication antennas being connected to at least one near-field communication reader circuit in order to be able to communicate with said electronic tags and to determine a position of each product on said display stand. The display stand comprises at least two radio frequency receivers spaced apart from one another and intended to receive a signaling signal originating from a communicating object associated with a person.

According to an implementation example, one of the presentation elements can be a tray comprising a plurality of near-field communication antennas and at least one near-field communication reader circuit.

According to another implementation example, one of the presentation elements can be a display stand hook comprising at least one near-field communication antenna arranged inside said hook and at least one reader circuit placed in a mounting base of said hook.

According to a third embodiment, the invention proposes a shop comprising at least one display stand as mentioned above, at least one first radio frequency transceiver placed in an entrance area of said shop, at least one second radio frequency transceiver placed in an exit area of said shop, and a centralized processing system configured to:
- detect a communicating object in the entrance area using the at least one first transceiver,
- associate the communicating object with a person and with a basket of said person,
- detect a handling of a product on a display stand according to the above-mentioned method and record the product removed or replaced as being added to the basket or removed from the basket respectively, according to whether the product handled was removed from the display stand or replaced on the display stand respectively,
- bill, by debiting a bank account associated with the person, the products recorded in the basket when the person is detected in the exit area by the second transceiver.

BRIEF DESCRIPTION OF THE FIGURES

The invention will be better understood and other characteristics and advantages thereof will become apparent on reading the following description of particular embodiments of the invention, given as illustrative and non-limitative examples, and with reference to the attached drawings, in which.

DETAILED DESCRIPTION

In the present document, by "near-field communication" is meant the NFC technology limited to a few centimetres, and using antennas produced using conductive loops forming half-transformers, both on the side of a reader and on the side of an electronic tag. The reader is made up of a near-field communication antenna and a reader circuit connected to the antenna. The reader circuit supplies a modulated electrical signal to the antenna, which converts it to a modulated magnetic field. Communication is carried out via a magnetic field coupling the transmitting antenna of the reader and the energy harvesting antenna of an electronic tag. The electronic tag can modulate the field back by retro-modulation. The reader circuit demodulates this retro-modulation. For more details, a person skilled in the art can refer to the ISO standard 14443, which defines the operation of near-field communications.

In the present document, by "electronic tag" is meant an identification device comprising an electronic chip coupled to an antenna forming a coil and powering itself by means of the magnetic field created by the reader. Such an identification device is generally in the form of a tag which can be easily fastened on numerous types of packaging or products.

In order for communication to be established between the reader and the electronic tag, the electronic tag must receive a magnetic field having enough power to power the chip of the electronic tag. The distance that makes communication between the reader and the electronic tag possible depends on the dimensioning of the antennas of the reader and the antenna of the electronic tag, but also on the transmission power of the reader. By using a low transmission power on the reader side, an electronic tag can only be detected if it is very close to the transmitting antenna. According to the present invention, the transmission powers are limited so that it is not possible to detect an electronic tag beyond a few centimetres.

In the present invention, by radio frequency communication is meant wireless communications which are not near-field. The radio frequency communications used according to the invention are for example communications using the 2.4 GHz or 5 GHz frequency bands. Preferably, the invention refers to the communication standard IEEE802.15.1, better known by the name "Bluetooth". However, other communication standards can be used, such as for example the standard IEEE802.11, better known by the name "WiFi", or also a communication standard of the ultra-wide band (UWB) type such as for example standardized by the European Telecommunication Standard Institute (ETSI) under the reference EN 302 065.

According to the invention, the term "radio frequency" excludes all communication carried out in the near field even though, in the absolute, near-field communications constitute a form of radio communication using a carrier frequency.

In order to simplify the drawings as well as the explanations which follow from them, one and the same reference is used to define one and the same object or a similar object. By "similar object" is meant a different object providing one and the same function.

Figure 1:
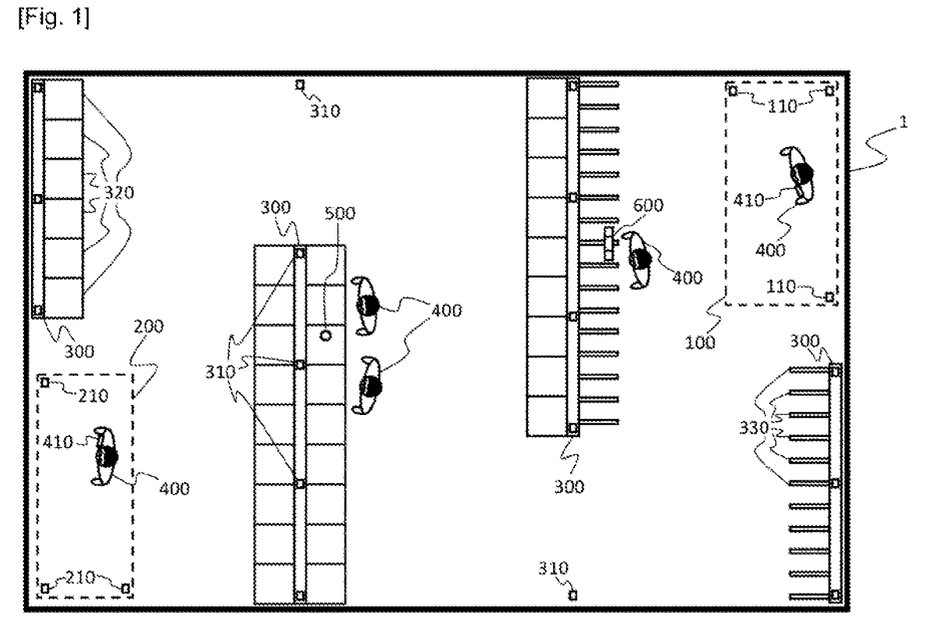
FIG. 1 represents a retail shop using the invention.

FIG. 1 represents a retail shop 1 implementing the invention in order to carry out purchases in a fluid manner without passing through the checkouts. According to this FIG. 1, the shop comprises an entrance area 100, an exit area 200 and display stands 300 defining an aisle that makes it possible for people 400 to move around in order to access products 500 or 600 arranged on the display stands 300. The arrangement of the shop is given by way of non-limitative example, the entrance 100 and exit 200 areas as well as the display stands 300 can be arranged in any other way without affecting the invention.

The entrance area 100 comprises radio frequency transceivers 110, for example of the Bluetooth type, in order to detect and communicate with a portable object 410, for example a mobile phone, held by a person 400. The number of transceivers 110 depends on the size of the entrance area 100 and the range of the transceivers 110, the important thing being that the entrance area 100 has at least one transceiver 110. According to an embodiment, the entrance area 100 is unoccupied so that a communication between the transceivers 110 and the portable object 410 is established when the person 400 passes through said entrance area 100. According to a variant, the entrance area 100 can comprise a means for detaining people such as for example a barrier or an air lock only allowing a person 400 access to the rest of the shop 1 after a communication between the portable object 410 and the transceivers 110 has been effected.

The exit area 200 comprises radio frequency transceivers 210, for example of the Bluetooth type, in order to detect and communicate with the portable object 410 of a person 400. For the same reasons as those described for the entrance area 100, the number of transceivers 210 can vary, the important thing being that the exit area 200 has at least one transceiver 210. According to an embodiment, the exit area 200 is unoccupied so that a communication between the transceivers 210 and the portable object 410 is established when the person 400 passes through said exit area 200. According to a variant, the exit area 100 can comprise a means for detaining people identical or similar to the detaining means of the entrance area 100.

The display stands 300 can be supermarket shelf displays, or shelf displays of any other type, intended to display products 500 to customers constituted by people 400 moving around in the shop 1. To this end, each display stand 300 comprises presentation elements of the tray type 320 or hook type 330 intended to receive the products 500. The display stands 300 are also equipped with radio frequency receivers 310. The number of receivers 310 can vary as a function of the size of the display stand 300, the important thing being that a display stand has at least two receivers 310 spaced apart from one another. Moreover the shop 1 can have other receivers 310 arranged in different places in the shop. The receivers 1 are receivers for example of the Bluetooth type, intended to receive messages originating from a portable object 410.

Each of the trays 320 comprises several near-field communication antennas connected to at least one reader circuit in order to be able to communicate with electronic tags. To this end, each product 500 intended to be placed on a tray 320 has an electronic tag affixed preferably on the part in contact with said tray 320. The electronic tag contains a unique identifier making it possible to accurately identify a product 500. The use of a low-strength reader circuit and a plurality of antennas in a tray 320 also makes it possible to locate a product. In order to have a locating accuracy smaller than the size of the antennas, it is possible to use a tray 320 and a locating method according to French patent application number 19-09528 filed on 29 Aug. 2019.

Each of the hooks 330 contains at least one near-field communication antenna connected to at least one reader circuit in order to be able to communicate with electronic tags. Preferably, the reader circuit is placed in a mounting base of the hook 330 and the near-field communication antenna extends over the whole length of the hook 330 serving to suspend products 600. To this end, each product 600 has an electronic tag placed close to the hook 330. Preferably, the electronic tag of a product 600 has an antenna situated around a suspension hole or slot intended to cooperate with the hook 330. A person skilled in the art can refer to French patent application number 19-09939 filed on 10 Sep. 2019 in order to obtain more details on the production of the hook 330 or of the electronic tags of the products 600.

Figure 2:
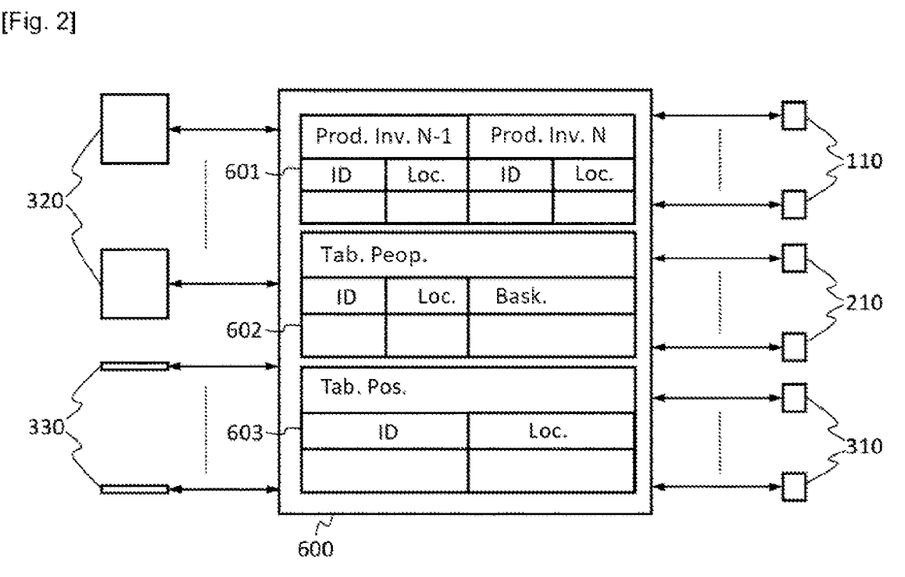
FIG. 2 shows a block diagram implemented in the shop of FIG. 1.

FIG. 2 shows the block diagram of the system implemented in the shop 1. A centralized processing system 600, for example a computer or a group of computers, is connected to the transceivers 110 and 210, to the receivers 310, to the trays 320 and to the hooks 330 via a wired connection, for example of the USB or Ethernet type, or via a radio frequency connection, for example of the WiFi or Zigbee type. The centralized processing system 600 comprises volatile and non-volatile memory as well as processors implementing programs to carry out several processing processes, which will be described below, in parallel. The memory also contains information tables which are used in the framework of the invention.

A first table 601 comprises inventories of products 500 and 600 placed on the display stands 300 of the shop 1. Said first table 601 contains at least one inventory N which has just been taken and inventory N−1 corresponding to an inventory taken just before the inventory N. Each of the inventories comprises a list of all the detected products, which contains the unique identifier ID of the product 500 or 600 and the location of the product in the shop 1. The location is indicated for example by Cartesian coordinates expressed in metres from a reference point in the shop. According to a variant, the first table 601 contains all the inventories taken in the shop in the course of the day, each inventory being time-stamped.

A second table 602 corresponds to the table of people 400 present in the shop 1. For each person 400 the table stores the identifier ID of the communicating object 410 associated with the person, the location of the communicating object 410 and a basket corresponding to a memory area storing identifiers of products 500 and/or 600 taken by said person. The location of the communicating object 410 corresponds to the last reported position of the communicating object 410 tracked in the same frame of reference as the location of the products 500 and 600. In a variant, the second table 602 contains a record of all the positions of the communicating object 410 since entering the shop 1, said positions being time-stamped in said record.

A third table 603 stores the positions of the transceivers 110 and 210, receivers 310, trays 320 and hooks 330 in the frame of reference of the shop 1. The positions of the trays 320 and hooks 330 correspond to a reference point and to a reference direction for each tray 320 and for each hook 330, from which the tray 320 or the hook 330 indicates a relative location of a product in the frame of reference of said tray 320 or said hook 330. According to a variant, the third table 603 can comprise the positions of the near-field communication antennas of the trays 320 and 330, the centralized processing system then carrying out a locating method directly from messages exchanged with the electronic tags of the products.

Figure 3:
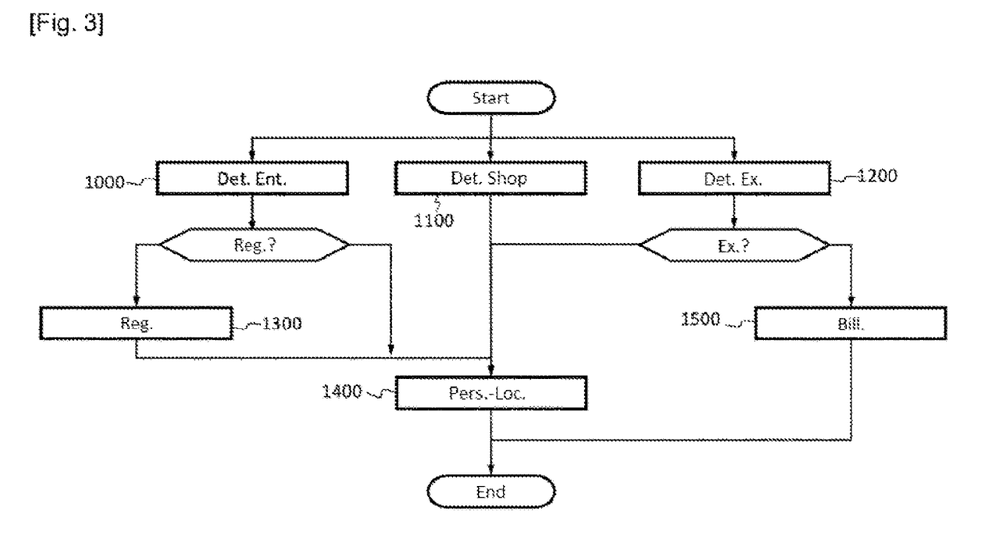
FIG. 3 illustrates an example of the method for detecting people in the shop of FIG. 1.

Once these first to third tables 301 to 303 have been defined, different processes are implemented in parallel by the centralized processing system 600 in order to update them and use them to carry out an automated commercial transaction. FIG. 3 illustrates a non-limitative example of the method for detecting people with the aim of managing the people in the shop 1. The method in FIG. 3 carries out the first to third steps 1000, 1100 and 1200 for detecting communicating objects 410 in parallel. In the first step 1000, the transceivers 110 notify the centralized processing system 600 of each signaling message received from a communicating object 410. The centralized processing system 600 checks whether the identifier is present in the second table 602. If the identifier is not present in the second table 602, the processing system 600 carries out a step 1300 of registering new people in the shop 1. If the identifier is already present in the second table 602, the processing system 600 carries out a person-locating step 1400. In the second step 1100, the receivers 310 notify the centralized processing system 600 of each signaling message received from a communicating object 410, then the person-locating step 1400 is carried out. In the third step 1200, the transceivers 210 notify the centralized processing system 600 of each signaling message received from a communicating object 410. The centralized processing system 600 determines whether the person is leaving the shop, for example by sending a message to the communicating object 410 which asks the person to confirm that they are leaving the shop. If the person confirms their exit, then the centralized processing system 600 carries out the billing step 1500. In a variant in which the exit area 200 comprises a means for detaining people, the exit detection can be performed by an action on a button associated with the detaining means, the opening of said detaining means only taking place once the billing step 1500 has been carried out.

The step 1300 of registering new people carries out an updating of the second table 602 by adding to it a new row corresponding to a new person. The person is identified by the identifier of the communicating object and an empty basket is associated with them. The locating of the person is then carried out during the person-locating step 1400. Moreover, during this registration step 1300, a message is prepared by the centralized system 600 in order to be transmitted to the communicating object 410 via one of the transceivers 110 so that the communicating object 410 puts itself in a signaling mode. The signaling mode consists of broadcasting a signaling message at a frequency, for example every hundred milliseconds, determined by the communicating device 410. The signaling message is of the "advertising" type, i.e. signaling to all the devices located in the communication range that a connection is possible. The signaling message contains an identifier for the communicating object intended for its tracking in the shop. In a variant, this registration step 1300 can comprise downloading an application to the communicating object, registering the person's bank details, confirming acceptance of general conditions of sale. In a variant in which the entrance area 100 comprises a means for detaining people, the person is only authorized to enter the shop after performance of the registration step 1300 is complete.

The person-locating step 1400 consists of retrieving all the signaling messages originating from one and the same communicating object 410 having been received substantially at the same time by the transceivers 110 and 210 and by the receivers 310. This step will be described below in connection with FIGS. 4 and 5.

The billing step 1500 consists of debiting the bank account of the person 400. During this step 1500, the contents of the basket corresponding to the identifier of the device located in the exit area 200 is retrieved by the centralized processing system 600. A bill is created by totaling the prices of the products contained in the basket. The centralized processing system 600 can then debit a bank account associated with the person. In an embodiment in which the communicating object 410 is a mobile phone, the account to be debited can be indicated by the person 400 by resending a bank account number or a bank card number to be debited on request. In another embodiment, the bank account to be debited was stored during the registration step 1300. The billing step 1500 ends with the deletion of the information relating to the person from the second table 602.

The registration and billing steps 1300 and 1500 can be carried out in different ways. However, it is important that, when accessing the shop 1, the person 400 associated with a portable device 410 is registered by the centralized system 600 and that a basket is associated with them. When the shop 1 is exited, the important thing is that a billing of the basket can be carried out.

Figure 4:
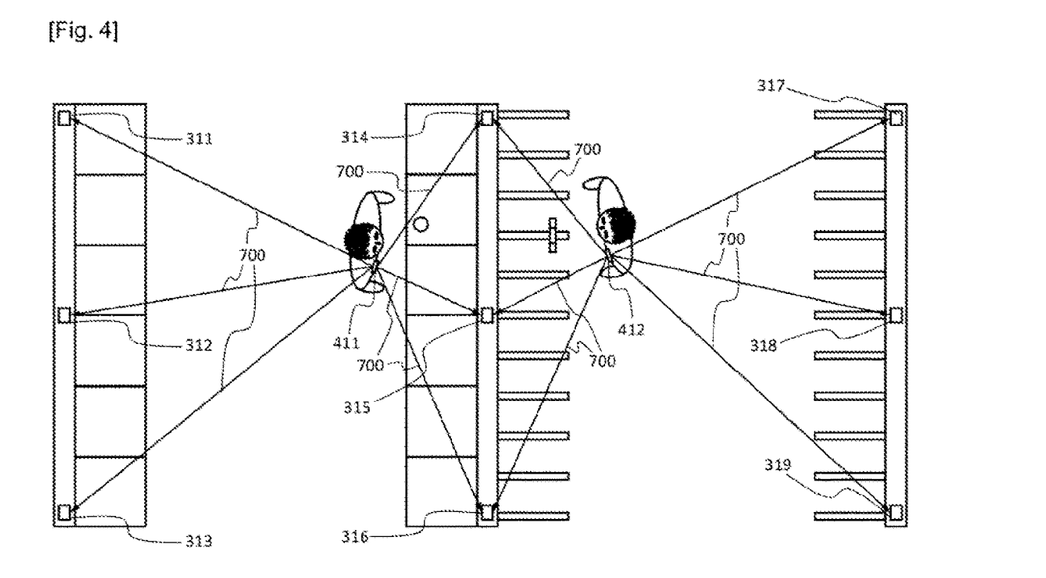
FIG. 4 illustrates a locating of a person in front of a display stand, FIG. 5 details a method for detecting a person.
Figure 5:
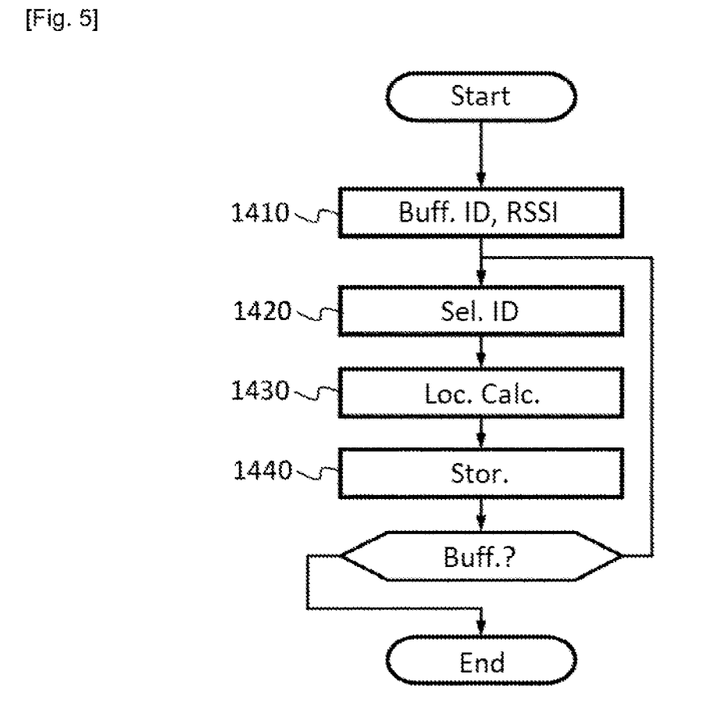

FIG. 4 shows a part of the shop 1 to illustrate the performance of the person-location step 1400 detailed in FIG. 5. A first step 1410 is carried out each time a signaling message is received by a transceiver 110 or 210 or by a receiver 310. The signaling message received is stored in a buffer memory of the centralized processing device 600. During storage of the message, the identifier of the communicating object is stored together with the strength level of the received signal, known by the acronym RSSI (Received Signal Strength Indication), measured by the transceiver 110, 210 or the receiver 310, all of this also being accompanied by the identification of the transceiver 110, 210 or of the receiver 310 which received the message. This step 1410 takes place continuously, independently of the other steps, so that the buffer memory collects all the messages received in a receiving queue.

During a step 1420, the centralized processing system 600 processes the oldest of the messages received in the receiving queue as a priority. To this end, it checks all the messages in the receiving queue in order to extract from it all the messages having one and the same identifier. In fact, as can be seen in FIG. 4, a communicating object 411 or 412 transmits a signal that can be received by all the receivers 311 to 319 situated at a distance that is close enough to receive the signal. By way of example, in the case of Bluetooth, the transmission power can be limited to a range of five metres. Thus, only the receivers 311 to 319 situated at less than five metres from the communicating object 411 or 412 can receive the signal corresponding to the signaling message. In FIG. 4 the arrows 700 illustrate the receipt of a message. For an identifier corresponding for example to the communicating object 411, six messages were received by six receivers 311 to 316. These six messages are selected in order to carry out the step 1430 of calculating the location.

In a variant in which the messages are time-stamped, step 1430 can be different. In this variant, the selection of the messages is carried out on the identifier of the communicating object and on a receiving time window the duration of which is less than the duration separating the sending of the two signaling messages.

In the step 1430 of calculating the location, the positions of the receivers 311 to 316 are retrieved from the third table 603. The strength level of the received signal (RSSI) for the message is associated with each of these positions. The location of the communicating object is then calculated by triangulation, for example by finding the barycentre of the positions of the receivers 311 to 316 weighted by the strength level of the received signal. Such a calculation makes it possible to locate the communicating object 411 with an accuracy of the order of a few centimetres. Once the barycentre has been calculated, the messages used for this calculation are deleted from the receiving queue.

A storage step 1440 updates the second table 602 by storing the calculated barycentre as being the location of the person corresponding to the identifier of the object communicating the received messages. In a variant in which the second table 602 contains a time-stamped record of the positions, the associated date can correspond to a date equal to the average of the dates of the messages used.

If other messages are present in the buffer memory, step 1420 is carried out again.

Such a solution for detecting the location of the people 400 can be sufficient in many shop configurations. Thus, when the method of the invention carries out the locating of people using only radio frequency receivers 310 placed close to or integrated in a display stand 300, the implementation is greatly simplified.

Figure 6:
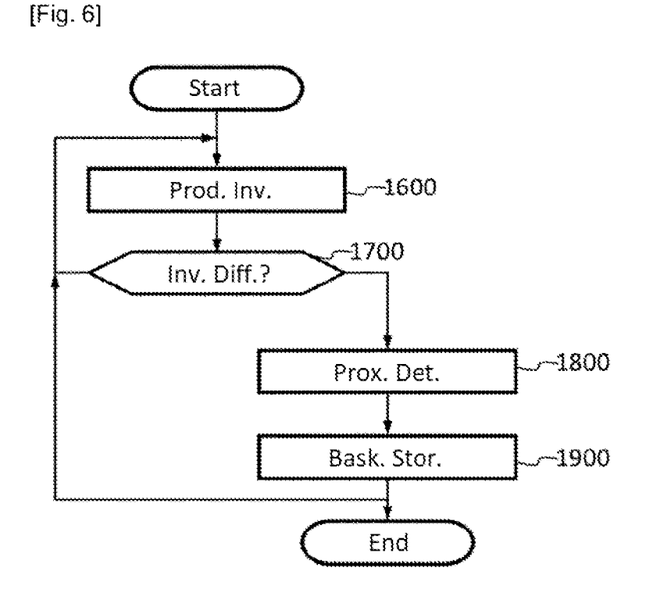
FIG. 6 shows a flow diagram of an embodiment example of a handling method according to the invention.

The people 400 being located in the shop, the handling method should now be detailed using the flow diagram in FIG. 6. The handling method comprises a first inventory step 1600, during which the first inventory table 601 is updated by the centralized processing system 600. A previously taken inventory becomes preceding inventory N−1 and a new inventory is taken during this step in order to be stored as latest inventory N. The details of taking the inventory will be described below in connection with FIGS. 7 and 8. In a variant in which the inventory is time-stamped, the inventory step 1600 stores an inventory end date.

Once the latest inventory N has been taken, it is compared with the preceding inventory N−1 in a step 1700. If no difference appears in the comparison of the inventories then a new inventory step 1600 is carried out. If a difference appears in the comparison of the inventories, this means that one or more products 500 or 600 have been handled between the two inventories. If the latest inventory indicates that a product 500 or 600 appears in the latest inventory N this means that it has been replaced on a display stand 300. If a product disappears in the latest inventory, this means that it has been removed from a display stand 300. The position of a replaced product 500 or 600 is indicated in the latest inventory N of the first table 601 and the position of a removed product 500 or 600 is indicated in the preceding inventory N−1 of the first table 601. Said position of the replaced or removed product 500 or 600 is then used in a proximity detection step 1800.

The proximity detection step 1800 carries out a comparison of the position of a replaced or removed product with the positions of the people contained in the second table 602. A distance calculation is carried out between the position of the replaced or removed product and the position of each person. The calculated distance is then compared with a first proximity threshold. The first proximity threshold is determined as being a maximum distance where it is not possible that another person could physically take the product. As the communicating object 410 is carried by the person 400, such a maximum distance corresponds to at most the length of an arm. The first threshold can thus be less than fifty centimetres but could be set to thirty centimetres. If the communicating object 410 is situated at a distance less than the first threshold, it can be considered that the person associated with the communicating object is the person carrying out the action of taking the product from or replacing it on the display stand.

However, a mobile phone can be further away from the product than the length of an arm. In this case it is necessary to set a second threshold corresponding to a maximum distance beyond which it is not possible to take the product. However, several people can be situated at a distance less than this second threshold and it is thus necessary to track all the people situated at a distance from the product comprised between the first threshold and the second threshold. Once all the people have been tracked close to the product, the distances are compared with one another. The person whose communicating object 410 is closest to the electronic tag of the handled product is then associated with the action of taking the object from or replacing it on the display stand.

When a person 400 has been associated with the taking or the replacement of a product 500 or 600 from or on the display stand 300, a storage step 1900 is then carried out. When a person 400 has taken a product 500 or 600 from a display stand 300, the identifier of the product is stored in the memory area of the second table 602 corresponding to the basket associated with the person. In a simplified example, it is considered that a person 400 can only replace a product 500 or 600 on the display stand 300 if that person has previously taken it. Thus, when a person 400 replaces a product 500 or 600 on a display stand 300, the product is deleted from the basket associated with the person.

However, there are cases where a person replaces a product when it is not in their basket. A person can take a product and, after discussion with another person, the other person can put said product back. In order to avoid undue product billing, it is thus necessary to track that a person has replaced a product that they did not take; this can be done by adding an item of information to the basket of the person indicating that the product was replaced without having been taken. Another possibility consists of checking in all the other baskets whether the product was taken by someone else and removing it from the basket of the person.

In a variant, the detection of handling can be used to track someone stocking the display stands. In this case, the baskets can indicate the products 500 or 600 replaced on the display stand 300 by the person 400 associated with the basket.

In another variant, all the actions of taking or replacing products 500 or 600 are recorded in the basket of a person 400. Thus, it is possible to analyse the hesitations of a person with respect to a product or with respect to two equivalent products.

Figure 7:
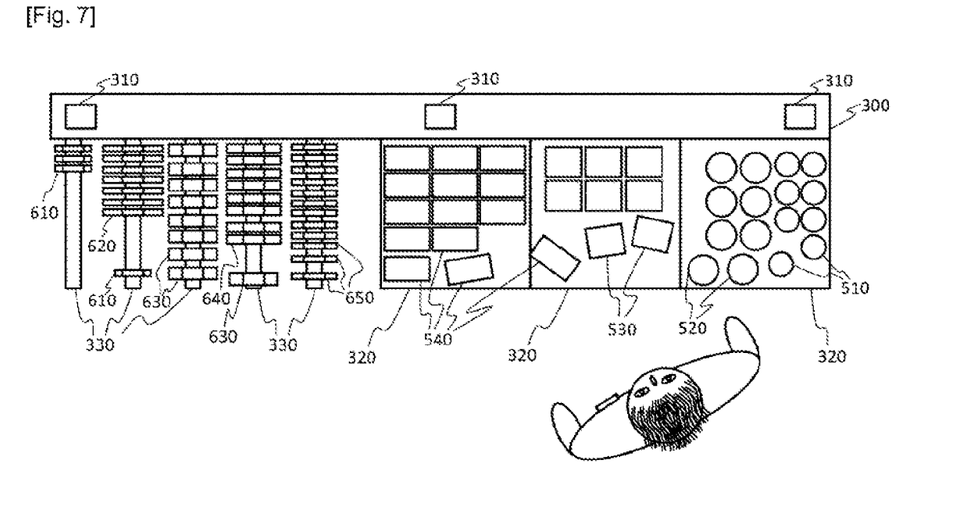
FIG. 7 illustrates a display stand according to the invention, FIG. 8 details an inventory method for products on the display stand of FIG. 7.

The handling method described previously makes it necessary to take an inventory of the products 500 and 600 present on a display stand 300. FIG. 7 shows a display stand 300 comprising several trays 320 and several hooks 330. Typically, the products 610, 620, 630, 640 and 650 of one and the same type are normally arranged on one and the same hook 330. However, as can be seen in FIG. 7, products 610 and 630 can be placed on the wrong hook 330. The products 510 and 520 are placed on one and the same tray 320 and the products 530 and 540 normally placed on a tray 320 which is dedicated to them can be placed on the wrong tray. The use of an electronic tag having a unique identifier makes it possible to identify each product individually. As indicated previously, the use of trays 320 and hooks 330 equipped with near-field communication antennas makes it possible to identify each product and also makes it possible to locate each product. The inventory method in FIG. 8 makes it possible to accurately locate each product 500 or 600 on the trays 320.

Figure 8:
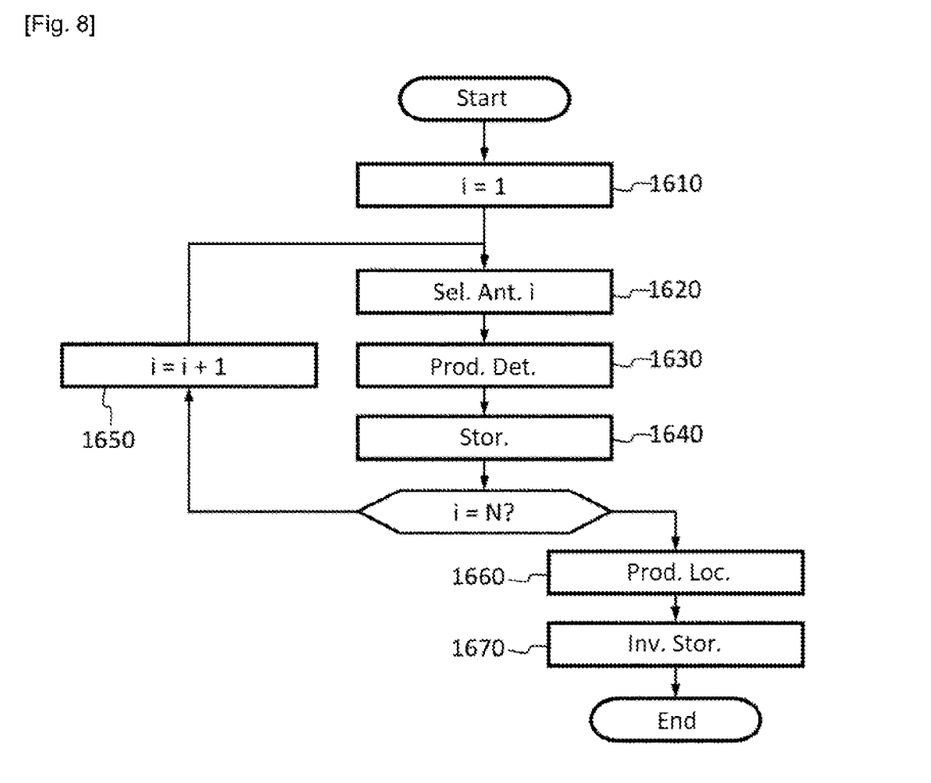

In an embodiment example, the method in FIG. 8 is carried out under the control of the centralized processing system 600, some of the steps being decentralized at the level of the trays 320 and of the hooks 330 and/or at the level of the display stand 300. During an initialization step 1610, an index i is initialized at the value 1. In a step 1620, a near-field communication antenna corresponding to the index i is selected. In a step 1630, a tag detection request is sent by the selected antenna and one or more electronic tag responses are awaited. The received responses are stored in a memory during a step 1640 and in particular the identification of the tag that responded, the antenna that received the message, optionally the response time of the tag. When the index i is not equal to N, N being a value corresponding to the total number of antennas to be interrogated, these three steps are repeated after incrementation of the index i in a step 1650. When the index i is equal to N, then the process passes to a locating step 1660.

The locating step 1660 makes it possible to obtain accuracy over the locating when several antennas communicate with one and the same tag. In particular on the trays 320, the latter comprise networks of interlaced antennas, and several antennas can detect one and the same tag. An average of the antenna positions makes it possible to obtain the location of a tag very accurately with respect to a reference point of the tray. The relative position of the tag on the tray must then be returned to the level of the shop, using the third table 603, as a function of the position of the tray and the direction thereof in the shop.

In a variant, steps 1610 to 1650 are carried out on the tray 320 as well as the first part of step 1460 corresponding to the relative location on said tray 320. The second part of step 1460 is carried out after transmission of the relative position of the tag on the tray 320. The centralized processing system 600 calculates the position of the electronic tag and of the product 500 which is associated with it in the shop by carrying out a vector addition of the position of the tray 320 in the shop and the relative position of the product on the tray 320. For more details on the implementation of the locating on a tray comprising a plurality of near-field communication antennas, a person skilled in the art can refer to the French patent application number 19-09528 filed on 29 Aug. 2019.

For the hooks 330 having a single antenna, a product 600 arranged on the hook 330 can only be detected by the single antenna of said hook. In this case, the position of the detected tag simply corresponds to the position of the hook 330 indicated in the third table 603.

In a variant, the hook 330 has several antennas over its length and can on its own locate a tag along it. The hook 330 then transmits the position of the tag on said hook and the centralized processing system adjusts the position of the tag by vectorially adding the position of the hook to the relative position of the tag on the hook in the direction of the hook stored in the third table 603.

Once each product 500 or 600 has been located, the centralized processing system 600 updates the inventory N of the first table 601. Such an updating consists of, for example, recording in said first table all of the electronic tag identifiers which correspond to the products 500 and 600. The calculated position is also recorded in the first table 601 in order to be able to be used to detect the proximity of a person as has been described previously.

Numerous variants are possible. In particular, it is recalled that the description makes reference to the Bluetooth communication protocol and to mobile phones. For practical reasons, the use of a mobile phone as communicating object makes it possible, by the simple downloading of an application, to integrate specific functionalities making it possible to implement the invention. For mobile phones that have Bluetooth, this protocol was preferably selected. However, it is possible to use another communication protocol such as the WiFi protocol, which is also supported by all mobile phones, making it possible to download an application. However, if WiFi is used to locate the mobile phones, it is preferable not to use it for communications between the centralized processing system and the different elements of the shop, in order to avoid interferences which could be detrimental to the locating. If the communicating object is a communication device specific to the shop, the use of the UWB protocol makes it possible to obtain greater accuracy over the communication distance than the Bluetooth protocol.

The centralized processing system 600 described previously carries out the majority of the processes described. However, it is possible to decentralize some of the processing at the level of the display stands. In particular, the handling method in FIG. 4 can be carried out at the level of a display stand which has at least two receivers 310. The inventory is then taken only at the level of a display stand 300, and the step of updating the basket is performed by sending a message to the centralized processing system 600 indicating that the person associated with a communicating object identifier 410 took a product from or replaced one on the display stand 300.

The handling method of the invention has been detailed and explained with reference to an automated commercial sales process in a shop. The handling method can be used to carry out the automated management of equipment inventories. By way of non-limitative example, the products can be tools that can be used by a group of people and the handling method can be used to ensure the tracking of the tools in order to know who has borrowed which tool, without any sort of transaction being carried out.

The invention claimed is:

1. Method for detecting the handling of products on a display stand by one or more people, said products being equipped with electronic tags each containing a unique identifier, each person being associated with an object communicating by radio frequency and periodically transmitting a signalling signal, said display stand comprising a plurality of near-field communication antennas, and at least two radio frequency receivers placed close to the display stand, a central processing unit connected to said display stand and to said receivers to carry out said method, which comprises repeating the following steps:
   a product inventory step, during which the display stand sends and receives messages via the near-field communication antennas in order to identify and to locate the electronic tags of products present on the display stand,
   a step of comparing inventories, during which the central processing unit determines a difference in the products present on the display stand between two successive inventory steps, said step identifying a product removed from or added to said display stand and determining a position on said display stand where said product was removed or added, a person-locating step, during which each of the radio frequency receivers receives a signalling signal, transmitted by an object communicating by radio frequency, measures the strength of the received signal and determines the position of the communicating object associated with a person by triangulation as a function of the position of the radio frequency receivers and the measurement of the strength of the received signal, an association step, during which the central processing unit associates a person with a product when the position of the communicating object associated with said person is located close to the position of the identified electronic tag of a product having been removed from or added to the display stand, said associated person having removed the product from or added it to the display stand.

2. Method according to claim 1, in which the association step associates the person with the identified product when the communicating object is located at a distance from the electronic tag that is less than a first distance threshold.

3. Method according to claim 2, in which the first distance threshold is less than fifty centimeters.

4. Method according to claim 2, in which, when one or more communicating objects are located at a distance from the electronic tag that is greater than the first distance threshold and less than a second distance threshold, the association step associates the person associated with the communicating object closest to the electronic tag of said product with the product.

5. Method according to claim 4, in which the second distance threshold is between one meter and two meters.

6. Method according to claim 1, in which the radio frequency receivers are receivers which comply with the IEEE Standard 802.15.1, in which the signalling signal is a signalling message indicating a unique identifier of the communicating object having sent said message and in which the triangulation is carried out on the messages received by the at least two receivers as a function of:
- a measurement of the signal strength received by each of said receivers for the messages containing the same unique identifier, and
- the position of said receivers.

7. Display stand for products comprising:
one or more presentation elements for receiving products equipped with electronic tags; and
a centralized processing unit,
wherein the presentation elements each comprise one or more near-field communication antennas, said near-field communication antennas being connected to at least one near-field communication reader circuit in order to communicate with said electronic tags and to determine a position of each product on said display stand during an inventory step, the central processing unit being configured to determine a difference in the products present on the display stand between two successive inventory steps, and to identify a product removed from or added to said display stand and determine a position on said display stand where said product was removed or added, and wherein the display stand comprises at least two radio frequency receivers spaced apart from one another and configured to receive a signalling signal originating from a communicating object associated with a person, the central processing unit being configured to associate a person with a product when the position of the communicating object associated with said person is located close to the position of the identified electronic tag of a product having been removed from or added to the display stand.

8. Display stand according to claim 7, in which one of the presentation elements is a tray comprising a plurality of near-field communication antennas and at least one near-field communication reader circuit.

9. Display stand according to claim 7, in which one of the presentation elements is a display stand hook comprising at least one near-field communication antenna arranged inside said hook and at least one reader circuit placed in a mounting base of said hook.

10. A shop comprising:
a display stand, having:
one or more presentation elements for receiving products equipped with electronic tags, wherein the presentation elements each comprise one or more near-field communication antennas, said near-field communication antennas being connected to at least one near-field communication reader circuit in order to communicate with said electronic tags and to determine a position of each product on said display stand, and
at least two radio frequency receivers spaced apart from one another and configured to receive a signalling signal originating from a communicating object associated with a person, with at least one first radio frequency transceiver placed in an entrance area of said shop, and at least one second radio frequency transceiver placed in an exit area of said shop, and
a centralized processing system configured to:
detect a communicating object in the entrance area using the at least one first transceiver,
associate the communicating object with a person and a basket of said person,
detect a handling of a product on the display stand according to the method of claim 1 and record the product removed or replaced as being added to the basket or removed from the basket, respectively, according to whether the product was removed from the display stand or replaced on the display stand, respectively, and
bill, by debiting a bank account associated with the person, the products recorded in the basket when the person is detected in the exit area by the second transceiver.

* * * * *